Figure 1:
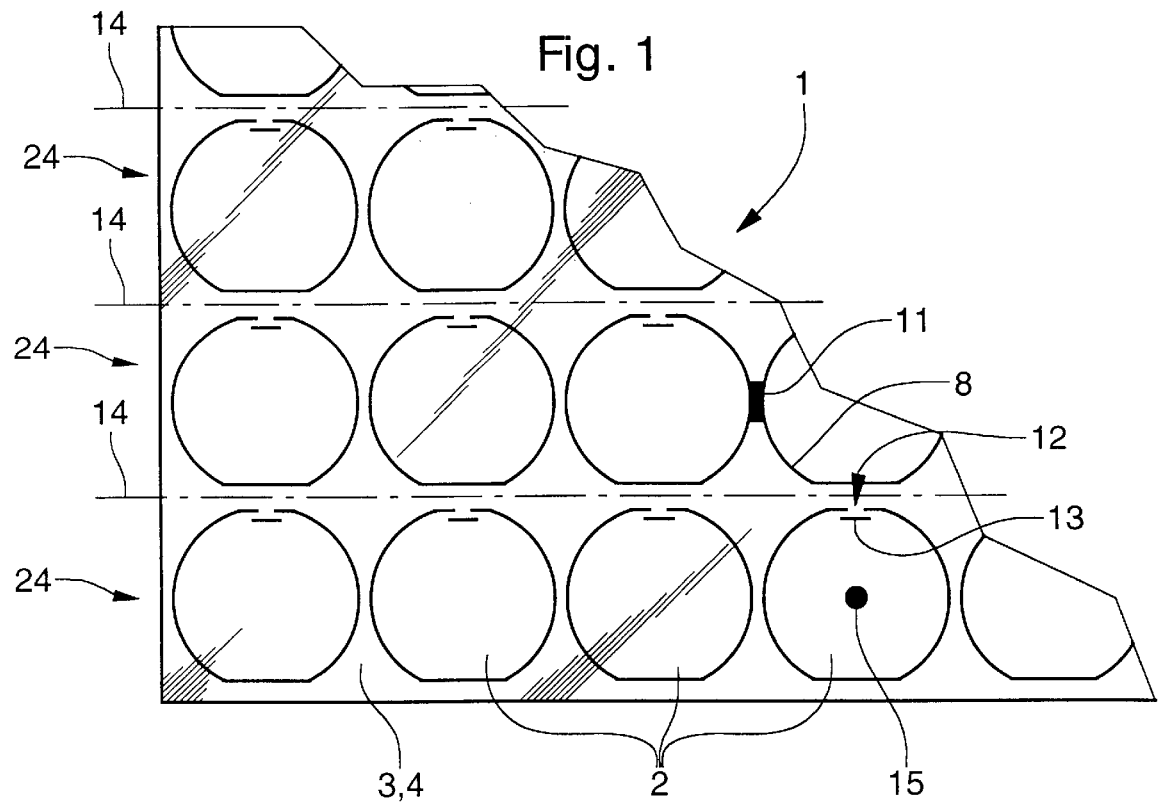

United States Patent [19]
Grupp et al.

[11] Patent Number: 6,066,018
[45] Date of Patent: May 23, 2000

[54] METHOD FOR MANUFACTURING ELECTRO-OPTIC CELLS, IN PARTICULAR LIQUID CRYSTAL CELLS, OR ELECTROCHEMICAL PHOTOVOLTAIC CELLS

[75] Inventors: Joachim Grupp, Neuchâtel; Yvan Térés, Cressier; Jean-Charles Poli, Les Geneveys-sur-Coffrane; Norbert Kopsits, Neuchâtel, all of Switzerland

[73] Assignee: Asulab S.A., Bienne, Switzerland

[21] Appl. No.: 09/018,140

[22] Filed: Feb. 3, 1998

[30]    Foreign Application Priority Data

Feb. 19, 1997 [EP] European Pat. Off. .............. 97102664

[51] Int. Cl.⁷ ................................................. G02F 1/1339
[52] U.S. Cl. .............................. 445/25; 349/190; 451/102
[58] Field of Search ............................... 349/190; 445/25; 451/102

[56]             References Cited

U.S. PATENT DOCUMENTS

| | | | |
|---|---|---|---|
| 4,094,058 | 6/1978 | Yasutake et al. | 29/592 R |
| 4,224,093 | 9/1980 | Kohyama et al. | 156/99 |
| 4,617,420 | 10/1986 | Dilts et al. | 136/244 |
| 4,648,215 | 3/1987 | Hashish et al. | 451/102 |
| 4,707,952 | 11/1987 | Krasnoff | 451/102 |
| 4,773,944 | 9/1988 | Nath et al. | 136/249 |
| 5,492,582 | 2/1996 | Ide et al. | 156/106 |
| 5,851,139 | 12/1998 | Xu | 451/102 |

FOREIGN PATENT DOCUMENTS

WO 91/16719 10/1991 WIPO .
WO 95/18456 7/1995 WIPO .

OTHER PUBLICATIONS

Patent Abstracts of Japan vol. 006, No. 222 (E–140), Nov. 6, 1982 & JP 57 126139A (Shin Nippon Denki KK), Aug. 5, 1982.

*Primary Examiner*—Kenneth J. Ramsey
*Attorney, Agent, or Firm*—Griffin & Szipl, P.C.

[57]              ABSTRACT

A method for manufacturing a plurality of electro-optic cells is disclosed, in particular for manufacturing liquid crystal display cells (2) or photovoltaic cells, each cell including a cavity (5) filled with a liquid and defined by sealed partitions (8, 9) between two plates (3, 4), in particular made of glass, provided with electrodes within the cavity. In a first step, a batch of cells (2) is manufactured, whose cavities are filled with the desired liquid and sealed. In a second step, the external contour (20) of each cell is cut, and if necessary a hole (10) passing through the cell, by means of a very high pressure water jet (30), the water either being loaded or not with an abrasive agent. Thus, the external layers (25, 26) such as a polarizer and a reflector may be applied onto the batch prior to the cutting step.

15 Claims, 2 Drawing Sheets

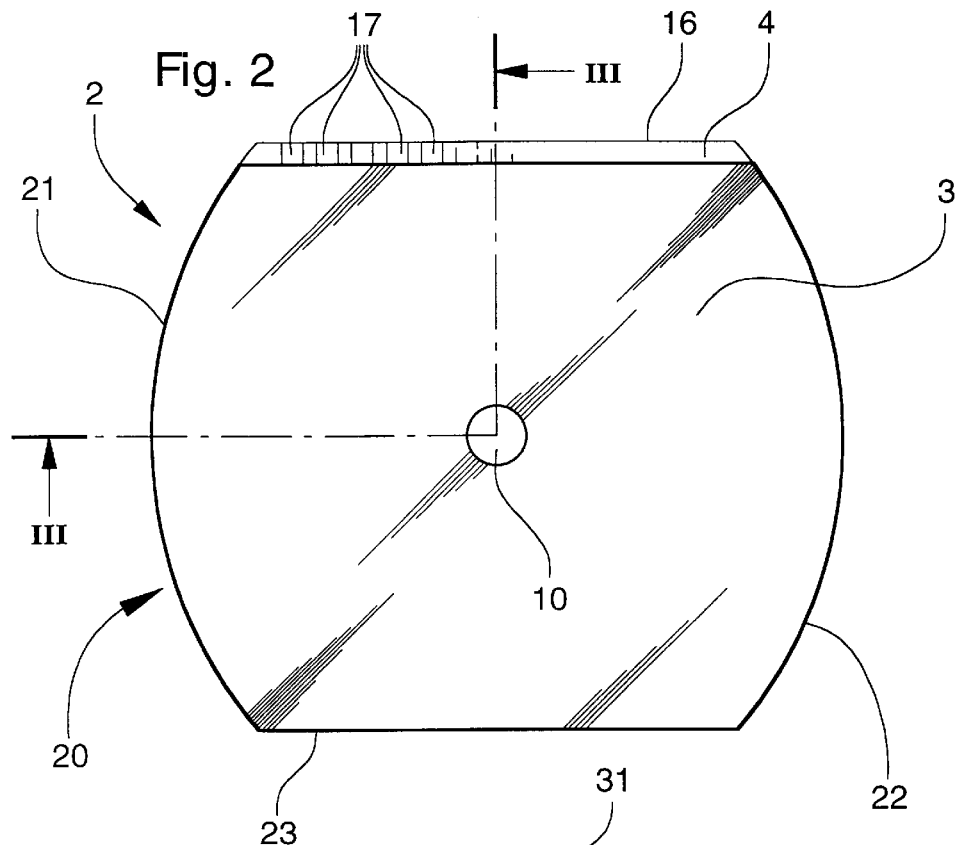
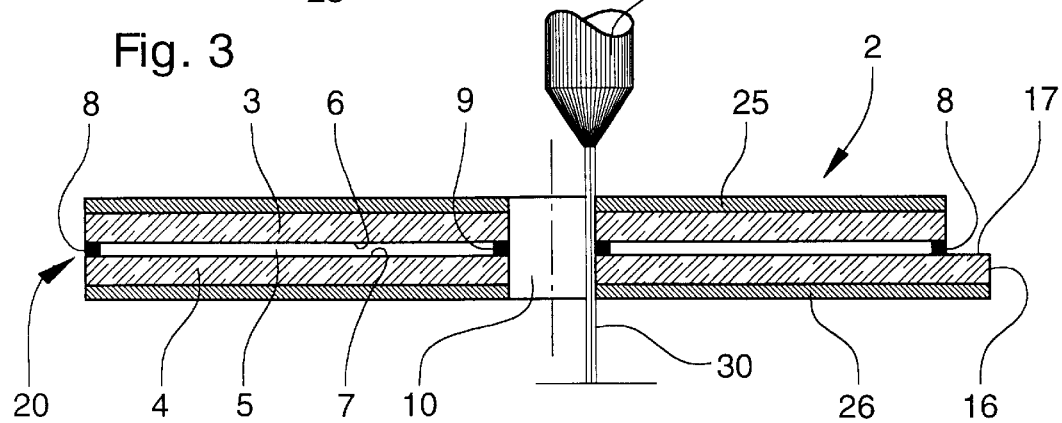
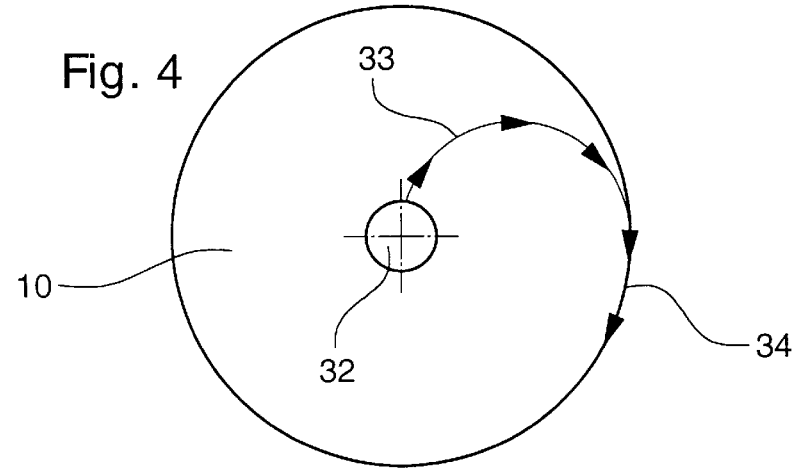

METHOD FOR MANUFACTURING ELECTRO-OPTIC CELLS, IN PARTICULAR LIQUID CRYSTAL CELLS, OR ELECTROCHEMICAL PHOTOVOLTAIC CELLS

The present invention concerns a method for manufacturing a plurality of electro-optic cells, in particular liquid crystal cells, or electrochemical photovoltaic cells, each cell including a cavity filled with a liquid and defined by sealed partitions between two plates provided with electrodes arranged within the cavity, the method including the following steps:

(I) collective manufacturing of a batch of cells filled with said liquid and sealed, the batch including two plates common to all the cells and a pattern of sealing material bonding said plates and forming the cell partitions, and (II) dividing the batch into individual cells and, where necessary, shaping a contour for each cell.

In the most commonly used method for manufacturing a batch of such cells, two large sheets of glass or synthetic material are prepared, at least one of such plates being transparent, electrodes and conductive paths are formed thereon, the sealing material is deposited on one of said plates and a filling opening is arranged for each cell, and the plates are assembled to form a unit including several rows of open cells. This unit is then divided into rectilinear strips via scratching and breaking the glass techniques (see for example U.S. Pat. No. 4,224,093) or by sawing along parallel straight lines. Since each cell has a filling opening along one edge of the strip, the cells are then filled and their openings are sealed, then the strip is divided into individual rectangular cells along straight lines perpendicular to the above-mentioned lines. At this stage, if the contour of the cells is to have portions different from the rectangular shape, such portions are shaped via grinding. Any external layers such as a polariser, a reflector or a "transflector", which are necessary in particular on liquid crystal display (LCD) cells, are applied subsequently, since they would be damaged by the cutting and grinding operations. These manufacturing steps which are to be performed individually on each cell make manufacturing more complex and more expensive than if they could be carried out on a batch of cells.

Manufacturing becomes even more complicated if each cell is to also include a central hole, for example for the passage of the shafts carrying the hands of a watch if the cell is at the centre of the dial or forms the latter. It has been proposed to make such a hole through a completed LCD cell via a sand jet having the shape of the hole, but this technique does not give precise cutting and damages the upper surface of the cell, in particular the external layer or layers which may have been applied previously.

U.S. Pat. No. 4,094,058 discloses several improvements on the conventional method for manufacturing a batch of LCD cells, in order to perform as much work as possible on the batch before it is divided into cells. One of the alternatives disclosed includes the two steps described hereinbefore. In order to obtain a batch of filled and sealed cells in the first step, the sealing material forming the pattern of partitions is applied onto one of the transparent plates, then the liquid crystal, then the second plate above and sealing is achieved. However, it is doubtful whether such sealing can be of good quality, given that the liquid has wet the surfaces to be bonded to each other. On the other hand, the cutting methods advocated in this patent require a certain distance between the partitions of two adjacent cells, which wastes a lot of space, and allows the production only of rectangular cells.

An object of the present invention is to improve the conventional collective batch manufacturing method, so as to allow as many operations as possible to be performed on the batch before it is divided into individual cells.

A particular object consists in carrying out step II via simple and efficient techniques, if possible in a single step, also to produce non-rectangular cells by avoiding grinding operations.

According to the invention, this object is achieved by a method of the type indicated in the preamble, characterized in that step II is achieved at least partially by means of a water jet, the water either including or not an abrasive.

Although the technique for cutting a glass plate with a very high pressure water jet is already known and applied, the idea of applying such a technique to cutting a batch of liquid filled cells in the present invention opens new and advantageous perspectives for the manufacturing concerned. Since the water jet is very fine and does not adulterate the neighbouring portions of the cut portion, the cells may be practically be finished by batch before cutting. Filling and sealing in particular may be effected via reliable methods and all the necessary external layers may be applied over the entire batch, thus more simply and economically than over individual cells. Moreover, cutting does not need to be performed in straight lines, but may directly follow the final contour of each cell, thereby avoiding any subsequent shaping such as grinding. The contour may have any shape, even concave, which is very difficult to achieve with conventional techniques. The plates acting as substrates may be made of glass, but also of other materials, in particular synthetic materials. Water jet cutting detail allows the sealing material pattern to be simplified, in particular by making partitions common to two adjacent cells, such partitions being able to be cut longitudinally by water jet during step II. If the cells include through holes, the latter may also be made by water jet cutting during the same step, for example on the batch before he corresponding cell is detached therefrom.

In an advantageous implementation of the method, at least one external layer, in particular a polarising layer, an anti-reflective layer and/or a protective layer, is applied onto at least one external face of the batch of cells before step II and is cut with the plates during step II. The batch of cells may also be bonded onto a support plate which will be cut at the same time as the cells.

As in the conventional method described hereinbefore, the batch of cells may be a rectilinear strip obtained by dividing a larger unit of cells into strips of cells, each including one or two rows of cells, so that each cell includes at least one rectilinear edge formed by an edge of the strip and including external conductive elements connected to the electrodes. The division into strips is preferably achieved before the cells are filled. The external layer or layers may be applied after the division into strips, if they do not have to cover the external conductive elements arranged on the rectilinear edges.

Figure 5:
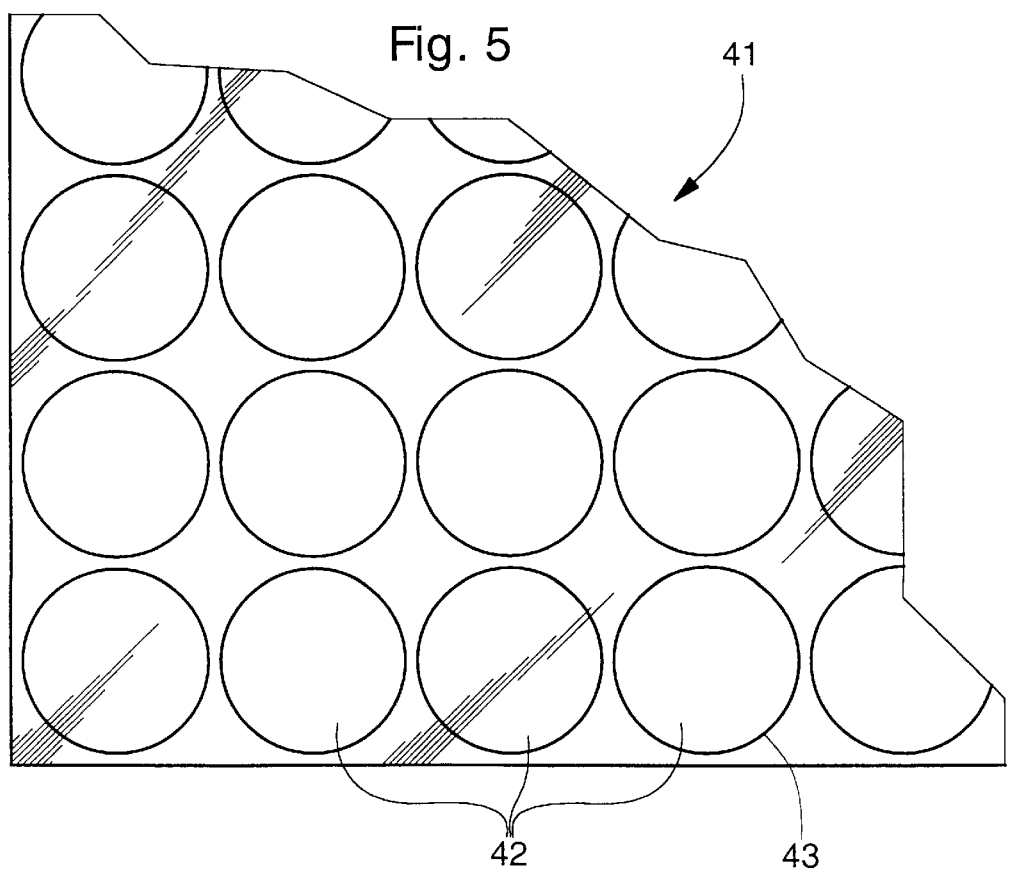

Other features and advantages of the present invention will appear in the following description of a preferred embodiment, given by way of non-limiting example with reference to the annexed drawings, in which:

FIG. 1 is a schematic partial top view of a batch of liquid crystal display (LCD) cells during manufacturing according to the invention, FIG. 2 is a top view of a cell detached from the batch of FIG. 1, FIG. 3 is a schematic cross-section along the line III—III of FIG. 2, showing, in particular, the making of a central hole in the cell, FIG. 4 shows schematically in top view a method for making the central hole, and FIG. 5 is a similar view to FIG. 1, for another type of cell.

FIG. 1 shows a unit 1 of LCD cells 2 during manufacture, all these cells being defined between two generally transparent superposed plates 3 and 4, for example glass plates.

Referring also to FIGS. 2 and 3, which show a known structure, it is seen that each cell 2 includes a cavity 5 intended to contain the liquid crystals, this cavity being defined by glass plates 3 and 4, covered with respective transparent electrodes 6 and 7, and by sealed partitions 8 and 9 made of a sealing material which bonds plates 3 and 4 to each other. In the example illustrated by FIGS. 2 and 3, the cell also includes a central hole 10, for example for the passage of the shafts carrying the hands of a watch, the cell being intended to be placed on the dial of the watch. Partition 9 follows the contour of hole 10, whereas partition 8 follows the external contour of cell 2.

In the unit shown in FIG. 1, peripheral partitions 8 of the cells are formed by a pattern of sealing material which may, for example, include partition portions 11 common to two adjacent cells. Only one of these common partitions 11 is shown to simplify the drawing, but the same arrangement may be adopted in the whole unit in order to simplify the configuration of the pattern. It is also seen that a filling opening 12 is arranged in peripheral wall 8 of each cell 2 facing a small wall 13 used to block the plug of adhesive material used for sealing opening 12 after the cells have been filled. In a known manner, openings 12 are aligned along parallel rectilinear dividing lines 14 shown in dot and dash lines. Internal partitions 9 are not shown in FIG. 1. At this stage, the area of future hole 10 of each cell is preferably occupied by a circular disk 15 of sealing material. Only one of these disks is shown in order to simplify the drawing. This disk has a larger diameter than the hole and it will be cut at the same time as the glass when the hole is made.

FIGS. 2 and 3 also show that each cell 2 includes a rectilinear edge 16 where lower plate 4 projects laterally with respect to upper plate 3 to expose close to the edge a series of conductive paths 17 (some of which are shown in FIG. 2) acting as external connections for electrodes 6 and 7. The rest of external contour 20 of cell 2 is common to glass plates 3 and 4 and includes two curved portions 21 and 22 and a rectilinear portion 23.

Manufacturing of LCD cells 2 is preferably performed in the following manner. Empty cell unit 1 is made in the conventional manner, i.e. the two glass plates 3 and 4 are covered with a pattern of electrodes and conductive paths by a known technique, then the sealing material is applied onto one of them so as to form a pattern including elements 8, 11, 13 and 15 described hereinbefore, and finally the second plate is applied after prior alignment with this pattern in order to be bonded to the other by the sealing material. Unit 1 is then divided into several batches 24 in the shape of rectilinear strips, by cutting them along parallel lines 14 by an appropriate technique to form rectilinear edge 16 of each cell, having external connections 17. A method of this kind, wherein a split line is traced on each glass plate by means of a diamond tool, the two lines being staggered, then the glass is broken along these lines, is disclosed for example in U.S. Pat. No. 4, 224, 093. It will be noted that each batch 24 may contain two rows of cells 2, if filling openings 12 of the cells of the second row are directed on the opposite side to those of the first row.

Then, each batch 24 is processed separately to effect, via a known technique, the filling of cells 2 with the liquid crystal, then the sealing of filling openings 12. All necessary external layers may then be applied onto each batch 24, preferably in the form of strips substantially covering the entire length of batch 24. As is shown by FIG. 3, upper layers 25 may thus be achieved, including for example a polarising film and a protective varnish, and lower layers 26 including for example a polarising and reflective film and a protective or reinforcement sheet.

The last step of the method consists of cutting out portions 21, 22 and 23 of the contour of each cell 2, which detaches it from batch 24, and also cutting central hole 10. This is preferably performed in a single working step by means of a very high pressure water jet cutting machine, preferably automatically controlled. Water jet 30 (FIG. 3) and nozzle 31 which produces it are preferably stationary, while the machine moves batch 24 in a plane so that the jet follows the trajectory to be cut on the batch. However, techniques using a mobile jet may also be used.

The case wherein the water jet cutting is performed on a partial batch including only one cell is also intended to be comprised within the scope of the present invention. This is the case if, in the example described hereinbefore, each strip 24 is divided along transverse lines, perpendicular to lines 14, by any known technique for separating cells 2 prior to cutting their contour 20 by water jet.

Each hole 10 of a cell 2 will preferably be cut out prior to contour 20, while the cell is still attached to the batch. FIG. 4 shows on an enlarged scale an advantageous method for cutting out hole 10, as a result of the fact that jet 30 has a diameter markedly smaller than that of hole 10. First of all the batch is placed in a position such that the jet is situated in an internal area of hole 10, for example at the centre of the hole, in order to make a first small hole 32 which will pass through the entire cell, this hole being able to have an irregular diameter given that it is initially blind. Batch 24 is then moved in such a way that the jet follows any trajectory 33 to rejoin the circular or other contour 34 of hole 10, then the movement is continued along this contour 34 to cut it along the exact shape desired.

As is shown by FIG. 3, the water jet cutting of external contour 20 of cell 2 cuts, at the same time, the two glass plates 3 and 4, external layers 25 and 26 and, where necessary, the sealing material forming partition 8 where a common partition such as 11 (FIG. 1) is provided. This technique gives a clean, clear cut and does not cause mechanical or chemical deterioration of external layers 25 and 26 in the proximity of the cutting line.

FIG. 5 illustrates the application of a similar technique for manufacturing a unit 41 of electrochemical photovoltaic cells 42 filled with a liquid and having for example a circular shape. Cells of this kind are disclosed for example in International Publications WO 91/16719 and WO 95/18456. As they need only two external connection terminals, these latter may be made either through holes arranged in the glass plates, or by conductive layers extending from the electrodes to the edge of the cell. Consequently, it is possible to manufacture batch 41 of filled cells 42 entirely via known methods, then to cut the whole of external contour 43 of each cell 42 by the very high pressure water jet technique, thereby also detaching each cell from the rest of the batch. Such a cell may also include a similar hole to hole 10 described hereinbefore, for example if the cell is to occupy the place of the dial of a watch.

What is claimed is:

1. A method for manufacturing a plurality of electro-optic cells, in particular liquid crystal cells, or electrochemical photovoltaic cells, each cell including a cavity filled with a liquid and defined by sealed partitions between two plates provided with electrodes within said cavity, the method including the following steps:

(I) collective manufacturing of a batch of cells filled with said liquid and sealed, said batch including two plates common to all the cells and a pattern of sealing material bonding said plates and forming said cell partitions, and (II) dividing said batch into individual cells and, where necessary, shaping a contour for each cell, wherein step II is achieved at least partially by cutting said batch by means of a water jet, the water either including or not an abrasive, wherein at least one external layer, in particular a polarising layer, an anti-reflective layer and/or a protective layer, is applied on at least one external face of said batch of cells prior to step II and is cut with the plates during step II.

2. A method according to claim 1, wherein said plates are made of glass.

3. A method according to claim 1, wherein each cell has a contour and the whole of said contour of each cell is cut during step II.

4. A method for manufacturing a plurality of electro-optic cells, in particular liquid crystal cells, or electrochemical photovoltaic cells, each cell including a cavity filled with a liquid and defined by sealed partitions between two plates provided with electrodes within said cavity, the method including the following steps:

(I) collective manufacturing of a batch of cells filled with said liquid and sealed, said batch including two plates common to all the cells and a pattern of sealing material bonding said plates and forming said cell partitions, wherein said batch of cells is a rectilinear strip obtained by dividing a larger unit of cells into several strips each including one or two rows of cells, so that each cell includes at least one rectilinear edge formed by an edge of the strip and including external conductive elements connected to said electrodes, and (II) dividing said batch into individual cells and, where necessary, shaping a contour for each cell, wherein step II is achieved at least partially by cutting said batch by means of a water jet, the water either including or not an abrasive.

5. A method according to claim 4, wherein said plates are made of glass.

6. A method according to claim 4, wherein each cell has a contour and the whole of said contour of each cell is cut during step II.

7. A method according to claim 4, wherein said division into strips is effected prior to filling the cells.

8. A method according to claim 7, wherein at least one external layer, in particular a polarising layer, an anti-reflective layer and/or a protective layer, is applied on at least one external face of said batch of cells prior to step II and is cut with the plates during step II and wherein said at least one external layer is applied after said division into strips.

9. A method for manufacturing a plurality of electro-optic cells, in particular liquid crystal cells, or electrochemical photovoltaic cells, each cell including a cavity filled with a liquid and defined by sealed partitions between two plates provided with electrodes within said cavity, the method including the following steps:

(I) collective manufacturing of a batch of cells filled with said liquid and sealed, said batch including two plates common to all the cells and a pattern of sealing material bonding said plates and forming said cell partitions, and (II) dividing said batch into individual cells and, where necessary, shaping a contour for each cell, wherein step II is achieved at least partially by cutting said batch by means of a water jet, the water either including or not an abrasive, wherein said partitions include, in step I, partitions common to two adjacent cells and wherein said common partitions are cut longitudinally by the water jet during step II.

10. A method according to claim 9, wherein said plates are made of glass.

11. A method according to claim 9, wherein each cell has a contour and the whole of said contour of each cell is cut during step II.

12. A method for manufacturing a plurality of electro-optic cells, in particular liquid crystal cells, or electrochemical photovoltaic cells, each cell including a cavity filled with a liquid and defined by sealed partitions between two plates provided with electrodes within said cavity, the method including the following steps:

(I) collective manufacturing of a batch of cells filled with said liquid and sealed, said batch including two plates common to all the cells and a pattern of sealing material bonding said plates and forming said cell partitions, and (II) dividing said batch into individual cells and, where necessary, shaping a contour for each cell, wherein step II is achieved at least partially by cutting said batch by means of a water jet, the water either including or not an abrasive, wherein each cell includes at least one through hole which is made via water jet cutting during step II.

13. A method according to claim 12, wherein said plates are made of glass.

14. A method according to claim 12, wherein each cell has a contour and the whole of said contour of each cell is cut during step II.

15. A method according to claim 12, wherein a water jet having a smaller diameter than that of said hole is used for cutting the hole, first of all for piercing the cell in an inner area of the hole, then for cutting a contour of the hole from the pierced area.

* * * * *